April 17, 1962  C. HILL  3,029,654
CHAIN-AND-SPROCKET DRIVES
Filed Sept. 14, 1960  3 Sheets-Sheet 1

Inventor
CLAUDE HILL
By
Mason, Fenwick & Lawrence
Attorneys

April 17, 1962

C. HILL 3,029,654

CHAIN-AND-SPROCKET DRIVES

Filed Sept. 14, 1960

Inventor
CLAUDE HILL
By
Mason, Fenwick & Lawrence
Attorneys

April 17, 1962 C. HILL 3,029,654
CHAIN-AND-SPROCKET DRIVES
Filed Sept. 14, 1960 3 Sheets-Sheet 3
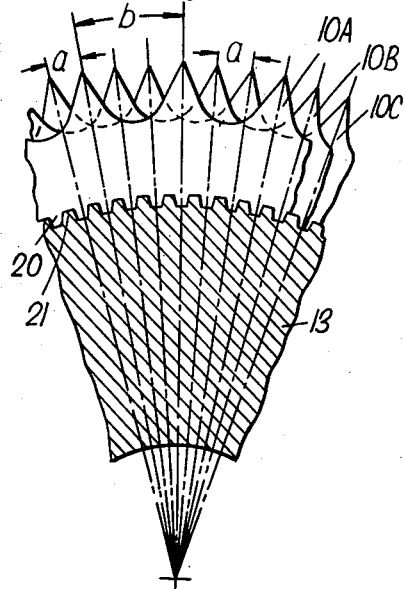
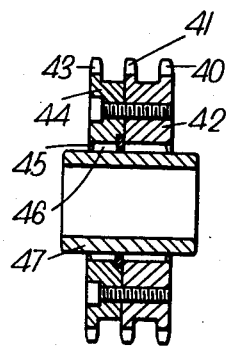
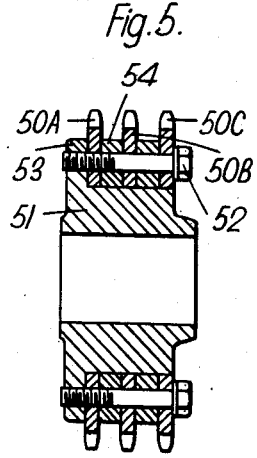
Inventor
CLAUDE HILL
By
Mason, Fenwick & Lawrence
Attorneys

United States Patent Office 3,029,654
Patented Apr. 17, 1962

3,029,654
CHAIN-AND-SPROCKET DRIVES
Claude Hill, Kenilworth, England, assignor to Harry
Ferguson Research Limited, Gloucestershire, England
Filed Sept. 14, 1960, Ser. No. 55,934
5 Claims. (Cl. 74—216.5)

This invention relates to chain-and-sprocket drives for the transmission of power from a rotary driving component to a rotary driven component, being especially applicable to motor vehicles for such purposes as transmitting power from crankshafts to camshafts or from engine-driven shafts in general to road-wheel axles or other shafts.

The object of the invention is to minimise vibration and noise in the operation of such drives.

The invention is a chain-and-sprocket drive for transmitting power from a rotary driving component to a rotary driven component and comprising two or more co-axial side-by-side sprockets of the same size forming a unit on a rotary driving component, two or more co-axial side-by-side sprockets of the same size as one another forming another unit on the rotary driven component and separate endless roller chains each extending between and led around an aligned pair of the driving and driven sprockets of both units; and the drive is characterised in that the driving sprockets are angularly staggered by a fraction of a tooth pitch and the driven sprockets are similarly staggered.

Preferably, the fraction by which the sprockets are angularly staggered is equal to a sprocket tooth pitch divided by the number of side-by-side sprockets per unit. That is to say, if a unit comprises three sprockets, they are staggered one-third of a tooth pitch.

The invention will now be described, by way of example, with reference to the accompanying drawings, in which:

FIG. 3 is a detail view drawn to a large scale, being a fragmentary section approximately on the line III—III of FIG. 1.

FIGS. 4 and 5 are axial sections of sprockets of different constructions from the sprockets according to FIGS. 1 to 3.

Figure 1:
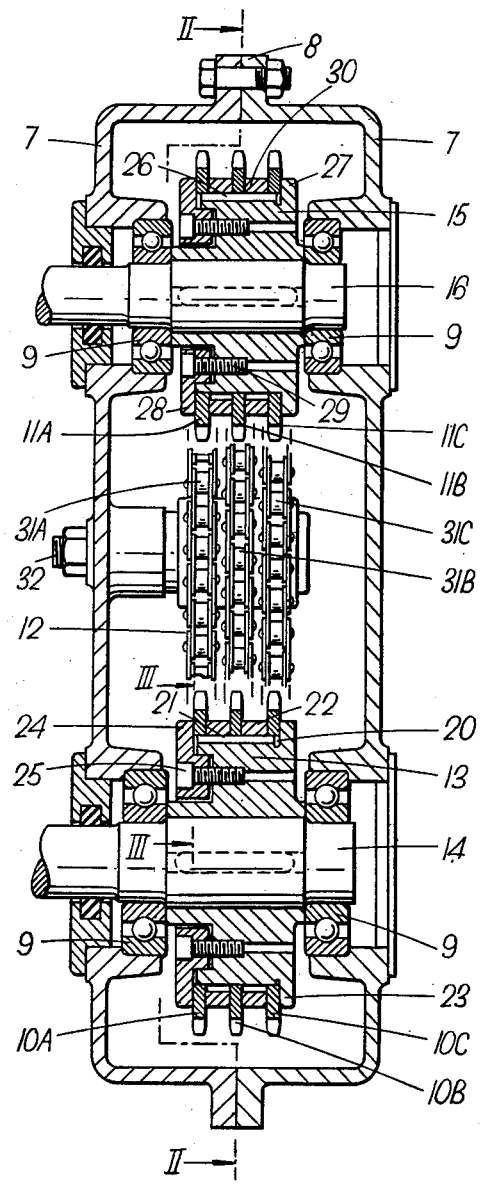
FIG. 1 is an axial section of a high-speed chain-and-sprocket drive housed in a casing.
Figure 2:
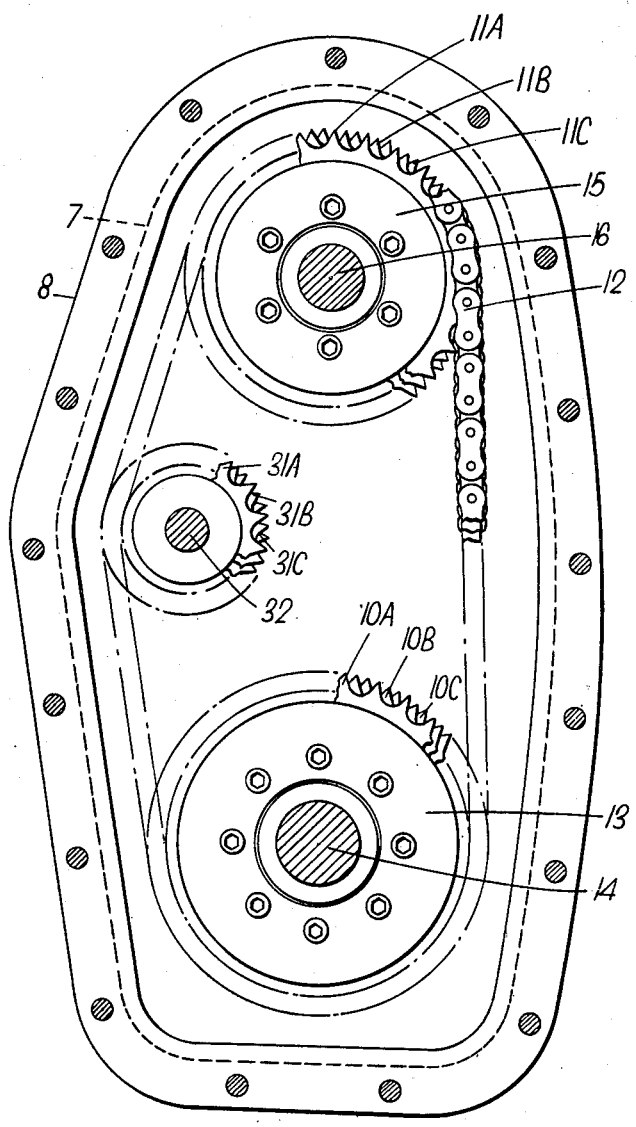
FIG. 2 is a corresponding side view, partly in section on the line II—II of FIG. 1.

The drive according to the example shown in FIGS. 1 to 3 has been devised for incorporation in a motor-driven vehicle to transmit the drive from an hydraulic torque converter output at a raised level to a change-speed gear or reversing gear or other transmission gear at a lower level.

Referring to FIGS. 1 to 3, the casing 7 of the drive is in two parts flange-jointed at 8 and provided with upper and lower pairs of co-axial bearings 9 for the rotary driving and driven sprocket units.

In the example, the drive consists of three component drives each comprising a driven sprocket 10A, 10B or 10C, a driving sprocket 11A, 11B or 11C and endless roller chain 12 made and arranged in any usual way. The driven sprockets 10A, 10B and 10C are all of the same size (i.e. as regards tooth pitch circle and number of teeth) and the driving sprockets 11A, 11B and 11C also are of the same size as one another; and the driven sprockets are respectively aligned with the driving sprockets. The rotary driven component includes a hub 13 keyed to a shaft 14; and the rotary driving component includes a hub 15 keyed to a shaft 16. These shafts are journalled in the bearings 9.

In the driven unit the sprockets 10A, 10B and 10C each have internal splines 20, and the splines of all three sprockets engage a single set of external splines 21 on the hub 13. The sprockets are axially equi-spaced by rings 22 and they are clamped in place against an end flange 23 by a circular end plate 24 which is secured to the hub by screws 25.

Correspondingly, in the driving unit the sprockets 11A, 11B and 11C are splined at 26 to the hub 15, which has an end flange 27 and an end plate 28 that is secured by screws 29. These sprockets are axially equi-spaced by rings 30.

As FIG. 2 shows, the sprockets of each unit are equi-angularly staggered, each two adjacent sprockets being arranged on the hub splines 21 (or 26) at an angular relationship $a$, FIG. 3, which is equal to one-third of the angular pitch $b$ of the teeth of each sprocket.

In the operation of such a chain-and-sprocket drive, assuming that each driving sprocket has $n$ teeth and rotates at a speed of $r$ revolutions per minute, the teeth of each driving sprocket will contact the rollers of its chain $nr$ times per minute. Therefore, in the triple drive of the example, the driving sprocket unit will impart 3 $nr$ impacts per minute to the three chains, and these impacts will occur at equi-spaced instants. Conversely, the teeth of the driven sprocket unit will receive 3 $nr$ impacts per minute from the rollers of the chain.

If one compares the drive of the example with a normal triple chain-and-sprocket drive, the following differences will be apparent:

(i) The impact periodicity of the drive of the example will be three times as great.

(ii) At each instant of inter-engagement between the teeth and rollers in the example, considering the action at one sprocket unit, only a single impact occurs, so that the magnitude of impact is only one-third of what occurs in the normal drive, because there at each instant of inter-engagement three simultaneous impacts occur.

In consequence of these differences the drive of the example will produce proportionally less vibration and noise.

In a practical example of a drive to which this invention relates, a typical input cruising speed is 3000 r.p.m. of the driving sprocket unit. Suppose that the sprockets of such a unit have, say, thirty teeth with a chain pitch of one-half inch, giving a chain speed of about sixty feet per second. Under these conditions, each driving sprocket wheel imparts 1500 impacts per second and, because of the equi-staggering of the sprocket teeth, the triple sprocket unit will have an impact frequency of 4500 impacts per second. Under maximum speed conditions, the speed may be increased to a magnitude of four or five thousand r.p.m., the impact frequency then being proportionally increased to about six or seven thousand per second. It is found that by virtue of such tripling of the impact frequency accompanied by a reduction of the magnitude of each impact to one third, the vibration and noise of the drive are considerably reduced.

In the example according to FIGS. 1 to 3, the sprockets of each unit are all identical. In such a construction, as hereinafter explained, the number of splines must be arithmetically related to the number of sprockets and the number of teeth per sprocket.

In the drive according to FIGS. 1 and 2 the chains are guided by a jockey pulley consisting of three side-by-side sprockets 31A, 31B, 31C. Each of these sprockets, ordinarily, would be individually free relatively to the others on the stationary supporting stub shaft 32. Nevertheless, if desired, the sprockets could be rigidly interconnected to form a unit such as the driving and driven composite sprocket units herein described.

Referring to FIG. 4, the sprocket unit therein shown consists of two sprockets 40, 41 (i.e. two rings of sprocket teeth) made as an integral entity, with a boss 42, and a third sprocket 43 with a boss 44 secured by screws 44 to the boss 42. The two bosses have splines 45 engaging splines 46 on a hub 47, which is adapted to be secured to a driving or driven shaft. The teeth of the three sprockets are equi-staggered in the manner illustrated by FIG. 2. In this case, it is immaterial how many splines are formed in relation to the number of sprockets per unit and the number of teeth per sprocket, the arrangement being such that the splines are cut in each hub in predetermined angular relation to the teeth.

It is practicable to have two rings 40, 41 of teeth on the same boss 42 because the teeth can be machined by a cutter working only from the outer side of each ring. Thus, it will be apparent that a four-sprocket unit may consist of two double-sprocket entities each similar to the entity 40, 41, 42.

Referring to FIG. 5, the sprocket unit therein shown consists of three identical sprockets 50A, 50B and 50C which are fitted side-by-side with their teeth in equi-staggered relationship, on a boss 51, which is adapted to be secured to a driving or driven shaft. The sprockets are secured against a flange 53 on the boss by bolts 52 screwed into the flange, and they are axially equi-spaced by rings 54 between the middle sprocket 50B and the outer sprockets 50A, 50C. The bolt-holes are equi-spaced, in accordance with normal practice, round a pitch circle whose centre is the axis of the sprocket unit. However, the number of bolt holes has a critical relationship to the number of sprockets per unit and the number of teeth per sprocket. Thus, in the case of the triple-sprocket unit shown, in which there are say thirty-two teeth per sprocket, there may be three or six or twelve bolt-holes. Any of these relationships ensures that the identical sprockets can be set with their teeth equi-staggered in the manner illustrated by FIG. 2.

It is of importance to economical production to be able to supply for each sprocket unit a set of sprockets which are all identical, as in FIGS. 1 to 3 and in FIG. 5. Thus, the arithmetic rule governing the number of securing means, whether bolt holes or splines or other devices, should be understood.

GENERAL RULE

If the number of teeth per sprocket is a multiple of the number of sprockets, plus or minus one, the number of splines or bolt-holes must be a multiple of the number of sprockets per unit.

Applying this general rule, where $x$ and $y$ are any whole numbers:

*2-Sprocket Unit*

Number of teeth=$2x +$ or $-1$ (i.e. an odd number).
Number of splines or bolt-holes=$2y$ (i.e. an even number).
Example: Twenty-nine teeth and twenty-two splines or six bolt holes.

*3-Sprocket Unit*

Number of teeth=$3x +$ or $-1$.
Number of splines or bolt-holes=$3y$.
Example: Thirty-two teeth and twenty-four splines or nine bolt-holes.

*4-Sprocket Unit*

Number of teeth=$4x +$ or $-1$.
Number of splines or bolt-holes=$4y$.

*5-Sprocket Unit*

Number of teeth=$5x +$ or $-1$.
Number of splines or bolt-holes=$5y$.

In any case where circumstances oblige one to have a number of sprocket teeth not obtainable by the foregoing general rule, for identical sprockets one is practically confined to the use of splines, of which there must be the number of teeth multiplied by the number of sprockets.

Any of various further modifications may be made within the scope of the invention. In the example, the chain-and-sprocket drive is a speed-reducing gear, but the invention is equally applicable to a speed-increasing gear or a one-to-one drive. It is not essential that adjacent sprocket teeth shall be equi-staggered, i.e. angularly staggered by equal fractions; instead, the staggering might be irregular to avoid the production of harmonic pulsations.

I claim:

1. A chain-and-sprocket drive for transmitting power from a rotary driving component to a rotary driven component and comprising two or more co-axial side-by-side sprockets of the same size forming a unit on a rotary driving component, two or more co-axial side-by-side sprockets of the same size as one another forming another unit on the rotary driven component, all of the aforesaid sprockets having teeth of the same pitch as one another, and separate endless roller chains each extending between and led around an aligned pair of the driving and driven sprockets of both units, the rollers of said chains all having the same pitch as the sprocket teeth; and the drive is characterised in that the driving sprockets are angularly staggered by a fraction of a tooth pitch and the driven sprockets are similarly staggered and in that the sprockets of each unit are spaced sidewise apart sufficiently to provide working room for the chains in the inter-sprocket spaces.

2. A chain-and-sprocket drive according to claim 1 in which the side-by-side sprockets forming a unit are identical with one another and are each formed with internal splines and in which the unit includes a hub having a single series of external splines with which the splines of the sprockets engage and in which the number of teeth per sprocket in a unit is a multiple of the number of sprockets, plus or minus one, and the number of splines per sprocket is a multiple of the number of sprockets.

3. A chain-and-sprocket drive according to claim 1 in which the side-by-side sprockets forming a unit are identical with one another and are each formed with internal splines and in which the unit includes a hub having a single series of external splines with which the splines of the sprockets engage and in which the number of splines is equal to the number of teeth per sprocket multiplied by the number of sprockets per unit.

4. A chain-and-sprocket drive according to claim 1 in which the side-by-side sprockets forming a unit are identical with one another and are each formed with bolt-holes equi-spaced round a pitch circle concentric with the sprocket and in which the unit includes a hub to which the sprockets are co-axially bolted.

5. A chain-and-sprocket drive according to claim 6 in which the number of teeth per sprocket in a unit is a multiple of the number of sprockets, plus or minus one, and the number of bolt-holes per sprocket is a multiple of the number of sprockets.

References Cited in the file of this patent

UNITED STATES PATENTS

| | | |
|---|---|---|
| 1,201,748 | Luce | Oct. 17, 1916 |
| 1,841,925 | Woodbury | Jan. 19, 1932 |

FOREIGN PATENTS

| | | |
|---|---|---|
| 786,527 | France | June 8, 1935 |